United States Patent [19]

Schnipke

[11] 3,747,992
[45] July 24, 1973

[54] RELAY VALVE FOR ELECTRO-PNEUMATIC CONTROL SYSTEM
[75] Inventor: Dennis E. Schnipke, Elyria, Ohio
[73] Assignee: The Bendix Corporation, South Bend, Ind.
[22] Filed: Apr. 16, 1971
[21] Appl. No.: 134,660

[52] U.S. Cl............... 303/40, 137/102, 137/596.16, 303/3, 303/7, 303/29
[51] Int. Cl............................................. B60t 15/02
[58] Field of Search.................... 137/102, 596.16; 251/30; 303/3, 7, 9, 20, 13, 29, 40

[56] References Cited
UNITED STATES PATENTS

| | | | |
|---|---|---|---|
| 3,620,577 | 11/1971 | Neisch et al. | 303/7 X |
| 2,985,489 | 5/1961 | Stelzer | 303/7 X |
| 3,456,991 | 7/1969 | Valentine et al. | 303/40 X |
| 3,545,815 | 12/1970 | Berg | 303/40 X |
| 3,182,678 | 5/1965 | Dahl | 137/102 |
| 3,402,972 | 9/1968 | Cooper et al. | 303/20 |
| 3,507,542 | 4/1970 | Cannella | 303/7 |

Primary Examiner—Milton Buchler
Assistant Examiner—Stephen G. Kunin
Attorney—Ken C. Decker and Plante, Hartz, Smith & Thompson

[57] ABSTRACT

A relay valve is disclosed for use in an electro-pneumatic braking system for air-braked vehicles. The relay valve includes a conventional housing defining a chamber therewithin in which a control piston reciprocates. The piston divides the chamber into a primary section and a delivery section. Movement of the piston closes a valve which exhausts the delivery section and opens a valve which communicates air from a pressurized supply to the delivery section, and ultimately to the brake actuators. The piston is moved in the usual manner by admitting service air from the brake control valve of the system. However, in order to reduce the response time of the system, a first solenoid valve communicates supply air to the primary section when the brake valve is applied and a second solenoid valve exhausts the primary section to atmosphere when the brake control valve is released. Appropriate control circuitry is disclosed to operate the solenoid valves.

3 Claims, 4 Drawing Figures

INVENTOR
DENNIS E. SCHNIPKE
BY Ken C. Decker
ATTORNEY

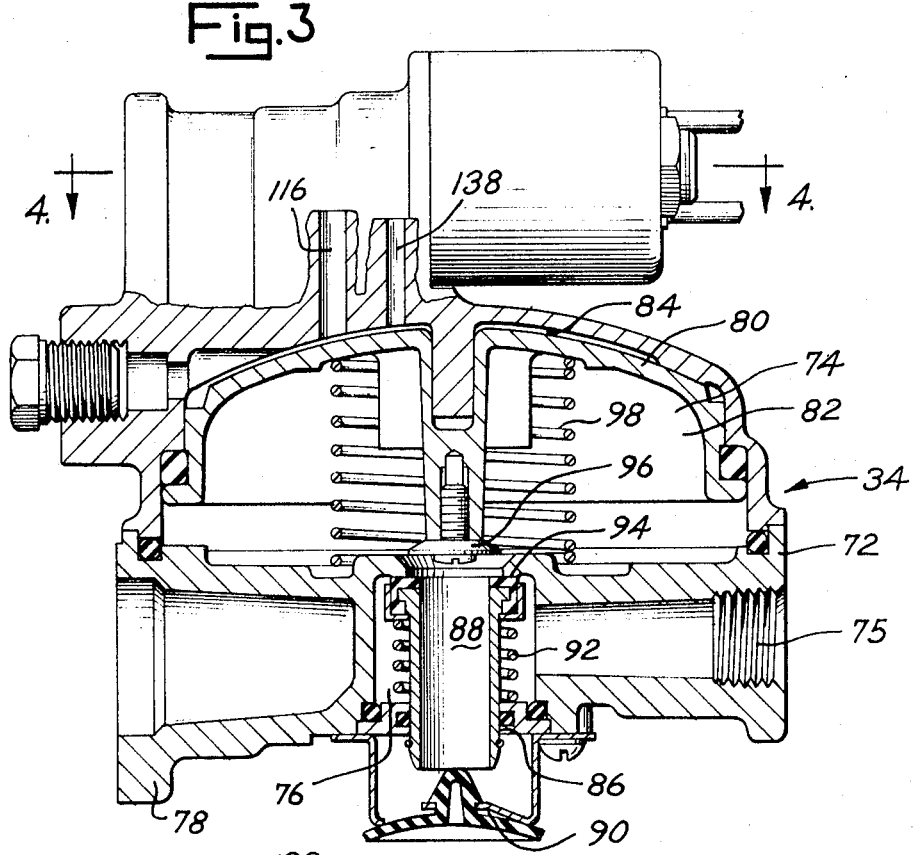
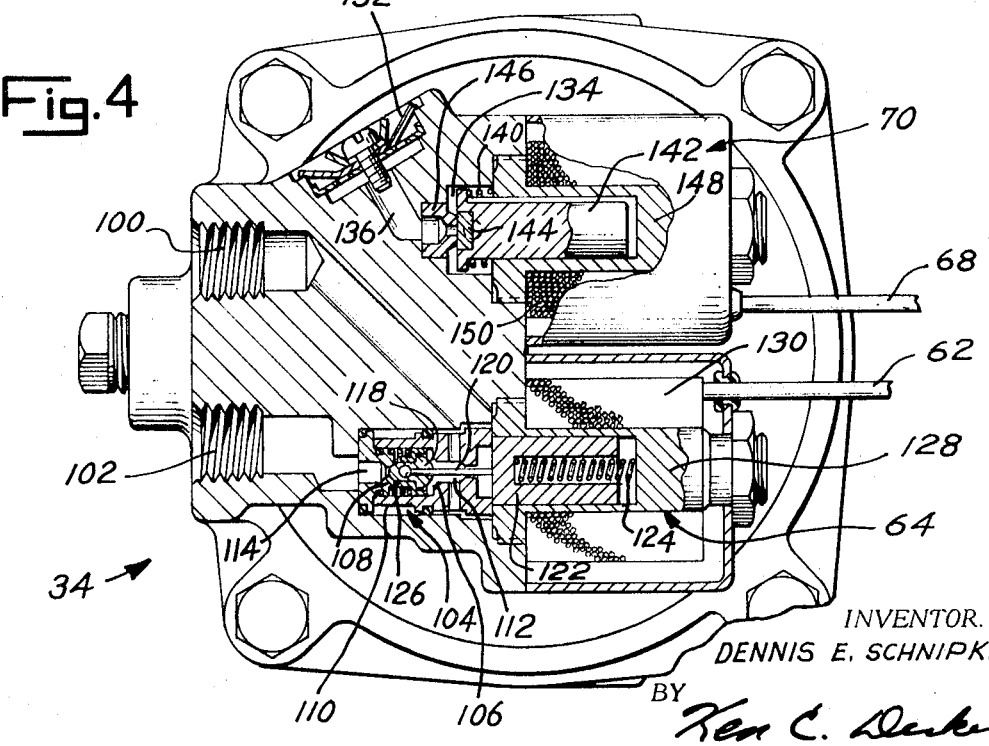

RELAY VALVE FOR ELECTRO-PNEUMATIC CONTROL SYSTEM

BACKGROUND OF THE INVENTION

This invention relates to a relay valve used with an electro-pneumatic braking system for an air-braked vehicle.

Conventional air brake systems employ an operator-operated brake control valve which actuates one or more relay valves that communicate these associated brake actuators with an air reservoir. Since pressure impulses are propagated at the speed of sound in the control air line which extends between the brake control valve and the relay valve, the rear brakes of the vehicle which are actuated by the relay valve are applied after the front brakes are applied. While in shorter vehicles this time delay is so small that it is insignificant, in longer vehicles, such as tractor-trailer combinations, the time delay may be several hundred milliseconds, which is long enough to detrimentally affect braking performance. The problem is particularly acute in so-called "turnpike trains" which may consist of two or more trailers pulled by a single power unit. Therefore, it is desirable to electrically propagate the control signal from the brake control valve to the relay valve which actuates the brakes of the vehicle.

To significantly reduce the time delay between operation of the brake control valve and operation of the relay valve, appropriate electronic circuitry has been designed. It is, therefore, also necessary to provide an electrically operated relay valve. Of course, the electrically operated relay valve must also respond to normal service air actuation to insure operation in case of a failure in the electronic control circuitry.

SUMMARY OF THE INVENTION

Therefore, an important object of my invention is to provide an electrically operated relay valve for use in an electro-pneumatic braking system.

Another important object of my invention is to provide a relay valve in which solenoid valves control communication between the primary chamber of the relay valve and an air supply and between the primary chamber of the relay valve and the atmosphere.

A further object of my invention is to provide a relay valve which is operated by solenoid valves and which may also be operated by service air communicated to the relay valve from the brake control valve.

A still further object of my invention is to provide a relay valve having a double acting solenoid valve which, upon actuation by appropriate control circuitry, both terminates communication between the brake valve and the relay valve through the service air supply port and initiates fluid communication between the relay valve and a source of air pressure.

DESCRIPTION OF THE DRAWINGS

FIG. 3 is a partial cross-sectional view of the relay valve used in the braking system illustrated in FIG. 1; and FIG. 4 is a cross-sectional view taken substantially along line 4—4 of FIG. 3.

DETAILED DESCRIPTION

Figure 1:
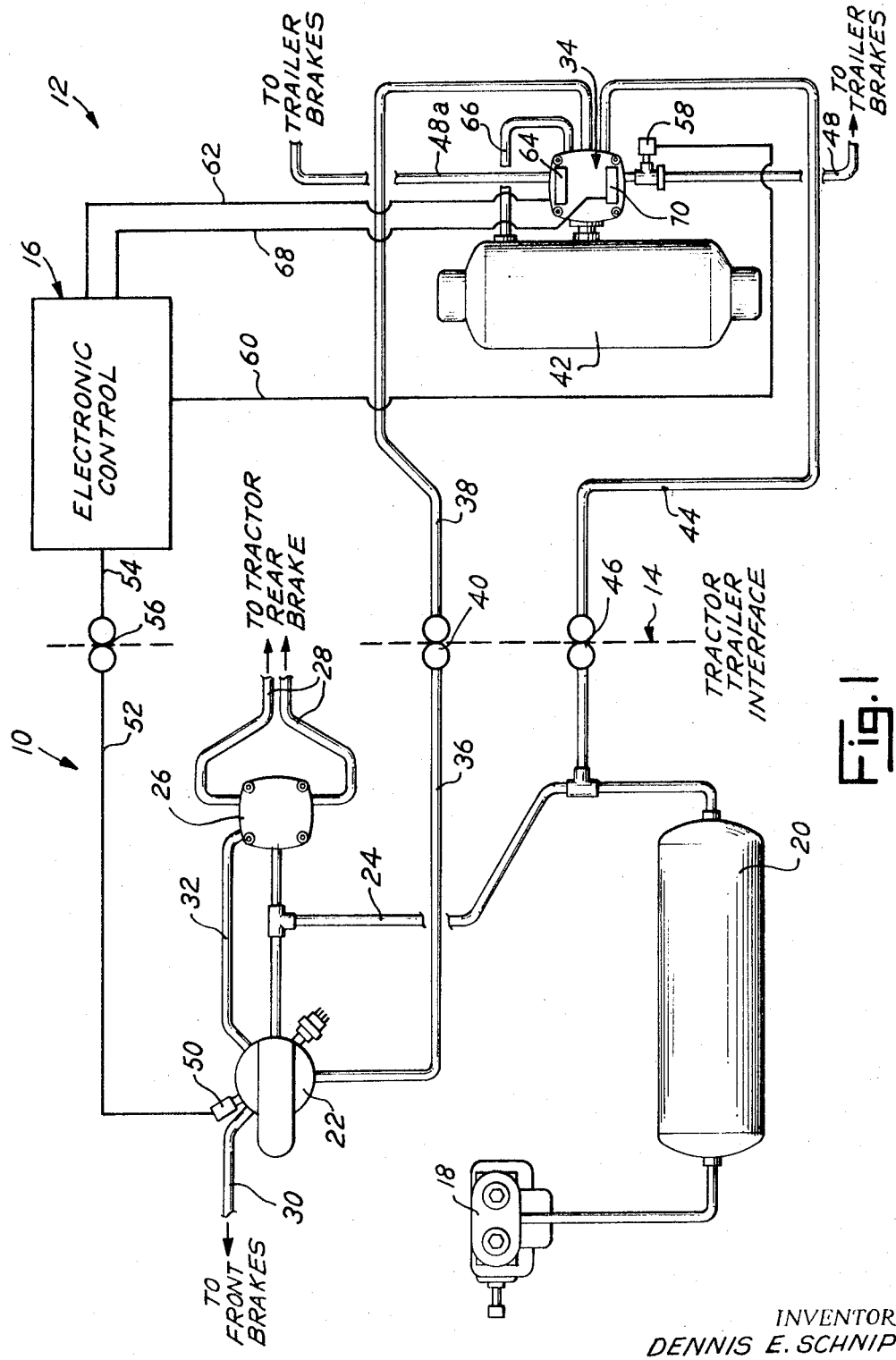
FIG. 1 is a schematic illustration of the air and electronic circuits of an electro-pneumatic braking system for a combination tractor-trailer vehicle made pursuant to the teachings of my present invention.

Referring now to FIG. 1 of the drawing, an electro-pneumatic braking system for use on a tractor-trailer combination vehicle is disclosed. The portion of the system normally carried by the tractor portion of the vehicle is indicated generally by the numeral 10 and the portion of the system normally carried on the trailer portion of the vehicle is indicated generally by the numeral 12. The interface between the tractor and the trailer portion of the system is indicated generally by the dashed line 14. The system includes an electronic control unit indicated generally by the numeral 16 which may be carried on either the tractor or the trailer portion of the vehicle; however, the electronic control unit 16 is illustrated in FIG. 1 as being carried by the trailer.

The portion of the braking system carried by the tractor includes a standard air compressor 18 which is powered by the engine of the vehicle. The air compressor 18 compresses atmospheric air to charge air reservoir 20. The reservoir 20 is communicated to the inlet of a standard operator-operated brake control valve 22 by a conduit 24. The conduit 24 also communicates the reservoir 20 with the supply port of a standard air relay valve 26 of a type well-known to those skilled in the art. When a brake application is effected, the relay valve 26 communicates air from the reservoir 20 to the rear brakes of the tractor through conduits 28. The outlets of the brake control valve 22 are communicated to the front brakes of the tractor through conduit 30, to the service port of the relay valve 26 through conduit 32 and to the service port of a second relay valve 34 carried by the trailer through conduits 36 and 38 which are joined together at the tractor-trailer interface by an appropriate coupling 40. The compressed air is also communicated from the reservoir 20 to a second reservoir 42 carried by the trailer through a conduit 44 which is coupled to a branch of the conduit 24 at the tractor-trailer interface by an appropriate connector 46. The delivery section of the relay valve 34 is communicated to the trailer brakes by conduit 48 and 48a. As is well known to those skilled in the art, when the vehicle operator effects a brake application upon operation of the brake valve 22, pressurized air from the reservoir 20 is communicated to the front brake actuators through the conduit 30 and to the service port of the relay valve 26 through conduit 32 and to the service port of the relay valve 34 through the conduits 36 and 38. Relay valves 26 and 34 are thereby operated to communicate pressurized air from the reservoirs 20 and 42 to the tractor and trailer brake actuator.

A pressure transducer 50 is communicated to the brake valve 22 and produces an output which is proportional to the pressure level developed at the brake control valve 22 when a brake application is effected. The output of the pressure transducer 50 is transmitted to the electronic control unit 16 through leads 52 and 54 which are joined together at the tractor-trailer interface by an appropriate connector 56. A second pressure transducer 58, which may be identical to the transducer 50, generates an output proportional to the pressure level developed at the delivery ports of the relay valve 34. The output of the transducer 58 is transmitted to the electronic control unit 16 through the lead 60.

The transducers 50 and 58 may be of the piezo-resistive type. A lead 62 transmits the output signal of the electronic control unit 16 to a solenoid valve 64 carried by the relay valve 34. The solenoid valve 64 controls communication between the reservoir 42 and the primary chamber of the relay valve 34 through a conduit 66 in a manner more completely described hereinafter. A lead 68 connects a second output of the control unit 16 with a second solenoid valve 70 carried by the relay valve 34 which controls fluid communication between the primary chamber of the latter and the atmosphere.

Referring now to FIGS. 3 and 4, the relay valve 34 includes a housing 72 defining a chamber 74 therewithin. The housing 72 is provided with a supply port 75 which is communicated with the conduit 44. The port 75 is communicated to an intermediate chamber 76 which in turn is communicated to the reservoir 42. A flange 78 on the housing 72 secures the relay valve 34 to a suitable mounting boss provided on the reservoir 42.

A piston 80 is slidably mounted in the chamber 74 and divides the latter into a delivery section 82 and a primary section 84. An annular valve member 86 defines a passage 88 therewithin which normally communicates the delivery chamber 82 with the atmosphere through an exhaust port 90. A spring 92 yieldably urges the valve member 86 into sealing engagement with the annular valve seating area 94 provided on the housing 72 to thereby prevent fluid communication between the intermediate chamber 76 and the delivery chamber 82. The piston 80 includes a valve operating portion 96 which is adapted to operate the valve member 86. A spring 98 yieldably urges the piston 80 and therefore, the valve operating portion 96 away from the valve member 86. As is well known to those skilled in the art, delivery ports (not shown) communicate the delivery chamber 82 with the conduits 48 and 48a, which communicate relay valve 34 with the trailer brake actuators.

Relay valve 34 is further provided with a service port 100, which is communicated to the brake valve 22 by the conduits 36 and 38, and a second supply port 102 which is communicated to the reservoir 42 by the conduit 66. Each of the ports 100 and 102 is communicated with a valve compartment generally indicated by the numeral 104 within the housing 72. Valve seats 106 and 108 divide the compartment 104 into a central section 110 and a pair of end sections 112 and 114. As is illustrated in FIG. 4, the service port 100 is communicated with the end section 112 and the supply port 102 is communicated with the end section 114. A passage 116 communicates the central section 110 with the primary section 84 of the chamber 74. A valve member 118 is slidably mounted in the central section 110 and is provided with a valve operating stem 120 which extends through the valve seat 106 to engage the end of an armature 122 which forms a part of the solenoid valve 64. A spring 124 yieldably urges the armature 122 to the left viewing FIG. 4, and another spring 126 yieldably urges the valve member 118 toward the valve seat 106. However, since the spring 124 is stronger than the spring 126, the valve member 118 is normally maintained in sealing engagement with the valve seat 108 and flow of air is permitted through the valve seat 106. The solenoid valve 64 further includes a pole piece 128 and an electrical coil 130. As is well known to those skilled in the art, when a current is passed through the coil 130, the armature 122 will be moved to the right viewing FIG. 4, against the bias of the spring 124, thereby permitting the spring 126 to urge the valve member 118 away from the valve seat 108 and into sealing engagement with the valve seat 106.

Relay valve 34 further includes a second exhaust port 132 which is communicated to a valve chamber 134 by a conduit 136. The chamber 134 is also communicated with the primary chamber 84 by a passage 138. A spring 140 yieldably urges an armature 142 which is a part of the solenoid valve 70, to the left viewing FIG. 4. The armature 142 carries a valve member 144 which is urged into sealing engagement with valve seat 146 by the spring 140 to normally prevent fluid communication between the conduit 136 and the valve chamber 134. The solenoid valve 70 further includes a pole piece 148 and coil 150. As is well known to those skilled in the art, when an electrical current is passed through the coil 150, the armature 142 is urged to the right viewing FIG. 4, thereby permitting fluid communication from the chamber 134 into the conduit 136.

Figure 2:
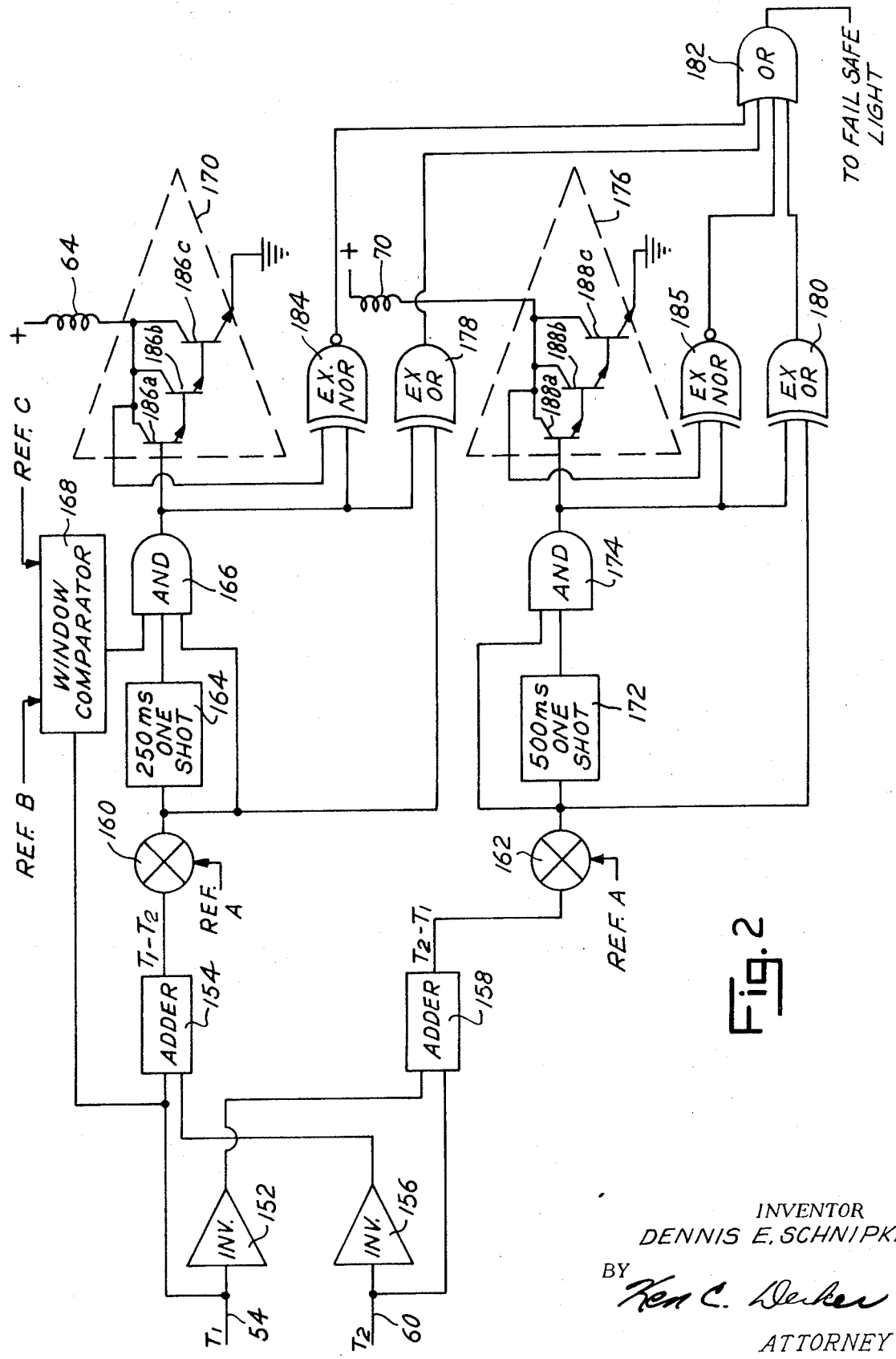
FIG. 2 is a logic diagram of the electrical circuitry for the electronic control unit used in the electro-pneumatic system illustrated in FIG. 1.

Referring now to FIG. 2, the circuitry included within the electronic control unit 16 will now be described in detail. The input $T_1$ from the transducer 50 is fed into an inverter 152 and is also fed into an adder 154. Similarly, the input $T_2$ from the transducer 58 is fed into inverter 156 and also into an adder 158. The output of the inverters 152 and 156 are fed into the input of the adders 158 and 154 respectively, so that the output of the adder 154 is equal to the quantity $T_1$ minus $T_2$ and the output of the adder 158 is equal to the quantity $T_2$ minus $T_1$. The output of the adder 154 is fed into the input of a comparator 160 which compares the quantity $T_1$ minus $T_2$ to some reference value. The reference voltage A is ideally representative of a 5 psi pressure level. Therefore, the pressure at the brake control valve 22 must exceed the pressure in the conduits 48 and 48a by at least 5 psi before the trailer brakes are actuated by the electronic control. Similarly, the output $T_2$ minus $T_1$ is compared to a reference level in a comparator 162. The reference level used in the comparator 162 is ideally also approximately 5 psi. The output of the comparator 160 triggers a 250 millisecond one-shot 164, the output of which is connected to one of the inputs of an AND gate 166. The output of the comparator 160 is also fed directly to the AND gate 166. The third input of the AND gate 166 is connected to the output of a window comparator 168 which compares the input $T_1$ with two reference levels B and C. The reference level B is proportional to approximately a 3 psi pressure level to assure that the vehicle operator has made the brake application. The reference level C is proportional to a pressure level of approximately 150 psi to assure that a malfunction in the control system has not resulted in a completely unreasonable input $T_1$. The output of the AND gate 166 activates a power amplifier 170 which drives the solenoid valve 64. Since the output of the AND gate 166 terminates after the one-shot 164 times out, the solenoid valve 64 can be actuated for a maximum of 250 milliseconds. This is a sufficiently long time period to assure that the pressure in the primary chamber 84 will become equal to the pressure level at the brake valve 22, but prevents a malfunction in the electronic control unit from actuating the brakes of the trailer for an indefinite time period. Similarly, the output of the comparator 162 is connected to the input of a 500 millisecond one-shot 172, the output of which is connected to an input of AND gate 174. The output of the comparator 162 is also connected directly to the AND gate 174. The output of the AND gate 174 is connected to a power amplifier 176 which drives the solenoid valve 70 which exhausts the relay valve 34, thereby relieving the trailer's brakes. The AND gate 174 produces an output only until the one-shot 172 times out so that the relay valve 34 is exhausted for a maximum of 500 milliseconds thereby preventing a malfunction in the electronic control unit 16 from exhausting the trailer's brakes for an indefinite time period.

To indicate a failure in the electronic control unit 16 or in the transducers 50 and 58, exclusvie OR gates 178 and 180 are used. One input of the exclusive OR gate 178 is connected to the output of the comparator 160 and another input of the exclusive OR gate 178 is connected to the output of AND gate 166. The output of exclusive OR gate 178 is connected to an input of an OR gate 182, the output of which actuates a fail-safe light in the operator's compartment of the vehicle. If the output of the comparator 160 is different from the output of the AND gate 166, a failure exists and the exclusive OR gate 178 and the OR gate 182 actuate the fail-safe light. Similarly, one input of the exclusvie OR gate 180 is connected to the output of the comparator 162 and the other input of the exclusive OR gate 180 is connected to the output of AND gate 174. If the output of the comparator 162 is different from the output of the AND gate 174, a failure exists and the exclusive OR gate 180 and the OR gate 182 turn on the fail-safe light.

Exclusive NOR gates 184 and 185 indicate a failure in the power transistors 186a, 186b, or 186c which are included in the power amplifier 170 and the transistors 188a, 188b, and 188c which are included within the power amplifier 176, respectively. One of the inputs of the exclusive NOR gate 184 is connected to the base of the transistor 186a and the other input of the exclusive NOR gate 184 is connected to the collector of the transistor 186a. If the two inputs to the exclusive NOR gate 184 are the same, a failure exists and the exclusive NOR gate 184 and the OR gate 182 turn on the fail-safe light. Similarly, one of the inputs to the exclusive NOR gate 185 is connected to the base of the transistor 188a and the other input of the exclusive NOR gate 185 is connected to the collector of the transistor 188a. If the two inputs of the exclusive NOR gate 185 are the same, a failure exists and the exclusive NOR gate 185 cooperates with the OR gate 182 to turn on the warning device in the vehicle operator's compartment.

MODE OF OPERATION

When a brake application is effected, the vehicle operator operates the brake control valve 22 to operate the front brakes of the vehicle and also to operate the relay valve 26 which operates the rear brakes of the tractor. The pressure level at the delivery port of the brake valve 22 is sensed by the transducer 50 and is transmitted to the control unit 16. When the pressure level at the brake valve 22 is increased to obtain a level of approximately 5 psi above the level of the output of the relay valve 34, the comparator 160 produces an output signal which is fed through the AND gate 166 which in turn actuates the power amplifier 170 to actuate the solenoid valve 64. When this occurs, the armature 122 of the solenoid valve 64 is urged to the right viewing FIG. 4, thereby permitting the spring 126 to urge the valve member into sealing engagement with the valve seat 106, thereby terminating fluid communication between the service port 100 and the primary chamber 84. Simultaneously, the other end of the valve member 118 moves away from the valve seat 108 permitting air to flow from the reservoir 42 into the primary section 84 through the passage 116. Air in the primary section 84 forces the piston 80 downwardly against the bias of the spring 98.

As the piston 80 moves, the valve operating member 96 first engages the valve member 86 to terminate the communication between the delivery section 82 and the exhaust port 90. Thereafter, further movement of the piston 80 urges the valve member 86 away from the valve seat 94 to permit high pressure air in the reservoir 42 to be communicated into the delivery section 82. As mentioned hereinabove, the high pressure air in the delivery section 82 is communicated to the trailer brake actuators through delivery ports (not shown) in the relay valve 34 and through the conduits 48 and 48a. When sufficient air pressure is communicated to the trailer brake actuators such that the transducer 58 senses a pressure which is approximately 5 psi below that sensed by transducer 50, the output of the comparator 160 terminates, thereby turning off the power amplifier 170 to thereby release the solenoid valve 64, to permit the valve member 118 to be returned to the position illustrated in FIG. 4. Thereafter, air communicates through the conduits 36 and 38 until normal braking pressure balance is achieved.

When the vehicle operator releases the brake control valve 22, such that pressure is maintained in the primary chamber 84 until the pressure transducer 50 senses a pressure in the brake control valve 22 which is approximately 5 psi below the pressure sensed by the transducer 58, the comparator 162 and AND gate 174 produce an output which actuates the power amplifier 176. Power amplifier 176 drives the solenoid valve 70 which urges the armature 142 carrying valve 144 away from the valve seat 146 to permit the primary section 84 to exhaust through the exhaust port 132 through the passage 138, chamber 134, and conduit 136. When this occurs, the spring 98 urges the piston 80 toward the position illustrated in FIG. 3, thereby reclosing valve member 86 against the valve seat 94 to prevent communication of supply air into the delivery chamber 82, the brakes of the vehicle will thereby be released.

It should be noted that the relay valve 34 will operate as a standard relay valve when the pressure levels between the brake valve 22 and the relay valve 34 are within predetermined limits or when the electronic control unit malfunctions, since service air is supplied to the service port 100 from the brake valve 22 through the conduits 36 and 38. As described above, when the solenoid valve 64 is released, the valve member 118 is urged away from the valve seat 106 and fluid communication is permitted from the service port 100 to the primary chamber 84 through the chambers 112, 110 and the passage 116. The pressure impulses from the brake control valve operates the piston 80 in the normal manner as described above to actuate the trailer brakes. However, pressure impulses are transmitted through the conduits 36 and 38 at the speed of sound, while the electronic control unit and the components operate at substantially the speed of light. Therefore, the time delay between an application of the brake valve 22 by the vehicle operator and application of the trailer brakes will be much less when the electrical control unit is working normally than when the malfunction requires that the relay valve be operated by service air from the brake control valve 22.

I claim:

1. In a relay valve for use in a braking system having a pressure source, a plurality of brake actuators, and a brake control valve for controlling said brake actuators:

a housing defining a chamber therewithin;

a piston slidably mounted in said chamber dividing the latter into first and second sections;

said first section being communicated with said brake actuators;

valve means operated by sliding of the piston for controlling communication between said first section and said pressure source and between said first section and the atmosphere;

said piston being slidable from a first position venting said first section to atmosphere and a second position closing communication between the first section and the atmosphere and initiating communication between the first section and said pressure source;

resilient means yieldably urging said piston toward said first position; and electrically operated valve means for communicating fluid pressure from the pressure source to the second section when a brake application is effected to slide said piston toward the second position and venting said second section to the atmosphere when the brake application is terminated;

said housing having a supply port communicating said second section with said pressure source, a service port communicated with said brake valve, and an exhaust port communicating said second section with the atmosphere;

said electrically operated valve means normally preventing communication between said supply and exhaust ports and said second section and permitting fluid communication between said service port and said second section; said electrically operated valve means terminating fluid communication between the service port and the second section and initiating fluid communication between said supply port and said second section when a brake application is effected, said electrically operated valve means terminating fluid communication between the supply port and the second section and initiating communication between the exhaust port and the second section when a brake application is terminated.

2. The invention of claim 1:

said electrically operated valve means including a double acting solenoid valve operable to both terminate fluid communication between the supply port and the second section when a brake application is effected.

3. The invention of claim 2:

said double acting solenoid valve including a bore defined within said housing, valve seats at opposite ends of said bore dividing the latter into a central compartment and a pair of end compartments, one of said end compartments being communicated to said supply port, the other of said end compartments being communicated to said service port, said central compartment being communicated to said second section, a valve member within said central compartment, resilient means yieldably urging said valve member into engagement with the valve seat between the central compartment and the one end compartment, and a valve operating member extending through one of said valve seats for engagement with the armature of the solenoid valve.

* * * * *